United States Patent [19]
Auer

[11] Patent Number: 5,417,297
[45] Date of Patent: May 23, 1995

[54] GEAR MECHANISM FOR TANDEM AXLES

[75] Inventor: Ernst Auer, Munich, Germany

[73] Assignee: Neunkirchner Maschinen-und Achsenfabrik GmbH & Co. KG, Munich, Germany

[21] Appl. No.: 50,649

[22] Filed: Apr. 22, 1993

[51] Int. Cl.⁶ .............................................. B62D 61/10
[52] U.S. Cl. ........................... 180/24.11; 180/24.04; 180/24.09; 180/363; 475/346
[58] Field of Search ............... 180/24.11, 24.04, 24.09, 180/355, 356, 361, 363, 24.13; 475/346, 331

[56] References Cited

U.S. PATENT DOCUMENTS

| | | | |
|---|---|---|---|
| 3,786,888 | 1/1974 | Nelson | 180/24.11 |
| 3,976,154 | 8/1976 | Clark et al. | 180/24.11 |
| 5,232,417 | 8/1993 | Amborn et al. | 475/346 |
| 5,240,462 | 8/1993 | Mochizuki et al. | 475/346 |

FOREIGN PATENT DOCUMENTS

| | | |
|---|---|---|
| 0180585 | 10/1988 | European Pat. Off. . |
| 520389 | 12/1992 | European Pat. Off. .......... 180/24.11 |
| 2434320 | 5/1979 | France . |
| 2414290 | 11/1974 | Germany .......................... 180/24.11 |
| 2522542 | 3/1979 | Germany . |
| WO8505330 | 12/1985 | WIPO . |

Primary Examiner—Eric D. Culbreth
Attorney, Agent, or Firm—Dennison, Meserole, Pollack & Scheiner

[57] ABSTRACT

A heavy duty work vehicle for rough terrain is provided with tandem axles wherein engine power is transferred equally to both the front and rear wheels of the tandem axles. A gear train having a torque divider splits any unequal torque on the front and rear wheels into two equal torques to obviate wheel lifting and loss of traction.

4 Claims, 3 Drawing Sheets

GEAR MECHANISM FOR TANDEM AXLES

SUMMARY OF INVENTION AND BACKGROUND

This invention involves a gear mechanism for tandem axles of work vehicles, particularly those designed for use in difficult terrain, with a gear drive for equal power transmission to the front and rear wheels of one side of a tandem axle.

Work vehicles with which the invention finds utility are, for instance, trucks used in forestry, including those equipped with saws, gripping equipment, branch-removal equipment and/or transport mechanisms.

Various types of gear mechanisms for tandem axles are well-known in present-day technology. It is possible, for example, to differentiate between tandem axles with gear drives and tandem axles with chain drives. In the case of tandem axles with gear drives, there are designs both with and without planetary gearing. The disadvantages of the latter design type are the limited ground clearance of the tandem axle housing, caused by the missing terminal reduction and the related large diameter of the rear wheels, as well as their heavy weight, since wide gear wheels are required. A further disadvantage lies in the fact that because of the torque direction only one rear intermediate gear wheel can be used, thus limiting the gear reduction to a maximum of 1.8 to 2.2. Furthermore, no brake retarding circuit is possible to the left or right of the differential, since, because there is no gear box reduction, it is necessary to have a large spur bevel gear in the differential or to have an additional two planetary gears installed next to the differential.

An advantage of the known tandem axles with gear wheels and without a planetary end stage is the fact that the lift effect of the tandem axle is slight because of the low gear reduction, and a uniform stress is thus put on the front and rear wheels. The lift effect becomes especially bad when, because of ground conditions, one of the tandem wheels becomes blocked, or is braked more strongly than the other wheel of the same axle and thus causes this wheel to lift up and lose its grip on the road. In the case of tandem axles with gear wheels and a planetary gear design, as, for example, described in DE-OS 25 22 542 and EP 01 80 585, this lift effect is also great because of the high gear reduction, which also leads to an unequal stress on the single gear, in which case the torque can disadvantageously be 100% on one side. The advantage of this design type is the fact that small, narrow gear wheels can be used, thus reducing the overall weight. Furthermore, use of a small rear wheel produces good ground clearance for the tandem boxes.

It is likewise possible to differentiate between design types with and without planetary gear end stages for the also well-known tandem axles with chain gears. These have the same kind of advantages and disadvantages as tandem axles with gear wheels.

OBJECTS OF THE INVENTION

One object of this invention is to provide a gear mechanism, in accordance with the description, in such a manner that the power distribution to the front and rear wheels takes place equally, thus significantly limiting the lift effect, where the gear reduction of the system and the ground clearance of the tandem axle boxes are kept high, and the weight of the mechanism is kept low.

Another object of my invention is to provide a gear mechanism for tandem axles that permits a high ground clearance by the use of a planetary gear with a small end-stage wheel.

A further object of the invention is to achieve a low total vehicle weight through the use of small size shafts and gear wheels or chains.

Further details, specifications, and advantages can be seen in the following description of a design depicted in the drawings and specification.

DETAILED DESCRIPTION

In a preferable design, the torque divider consists of a first and a second planetary gear, where the first and second wheels of the planetary gear are securely connected over a planetary gear shaft. The first wheel of the planetary gear is connected to a drum shaft and is best situated in an internal-geared housing part so that it can be turned, where this housing part is firmly screwed to the vehicle frame and the drive shaft is connected to a drive means for rotation of the drive shaft. On the other hand, the second planetary wheel of the second planetary gear is best situated so that it can be turned in an internal-geared housing part which is attached to a tandem axle housing by means of a clamp.

According to the invention, this mechanism makes it possible, if there is one-sided stress on the tandem wheels of a side, for the high torque to be divided, thus producing a small, effective tandem axle gear reduction with little lift effect. Through the feed into the tandem axle housing, a part of the torque thus introduced into this side of the tandem axle can be used to effectively counter the lift pressure. This means that the wheel lifting up is pushed against the ground. A slight lift, however, is not necessarily bad since it is thus possible to "climb over" an obstacle encountered on the ground, for example, a stone or a tree trunk. One should avoid, however, having the wheel that is lifting rise up all the way.

Further distribution of the torque behind the "support gear" used in the invention must be handled by means of gear wheels or chains up to a final gear just in front of the wheel.

Figure 1:
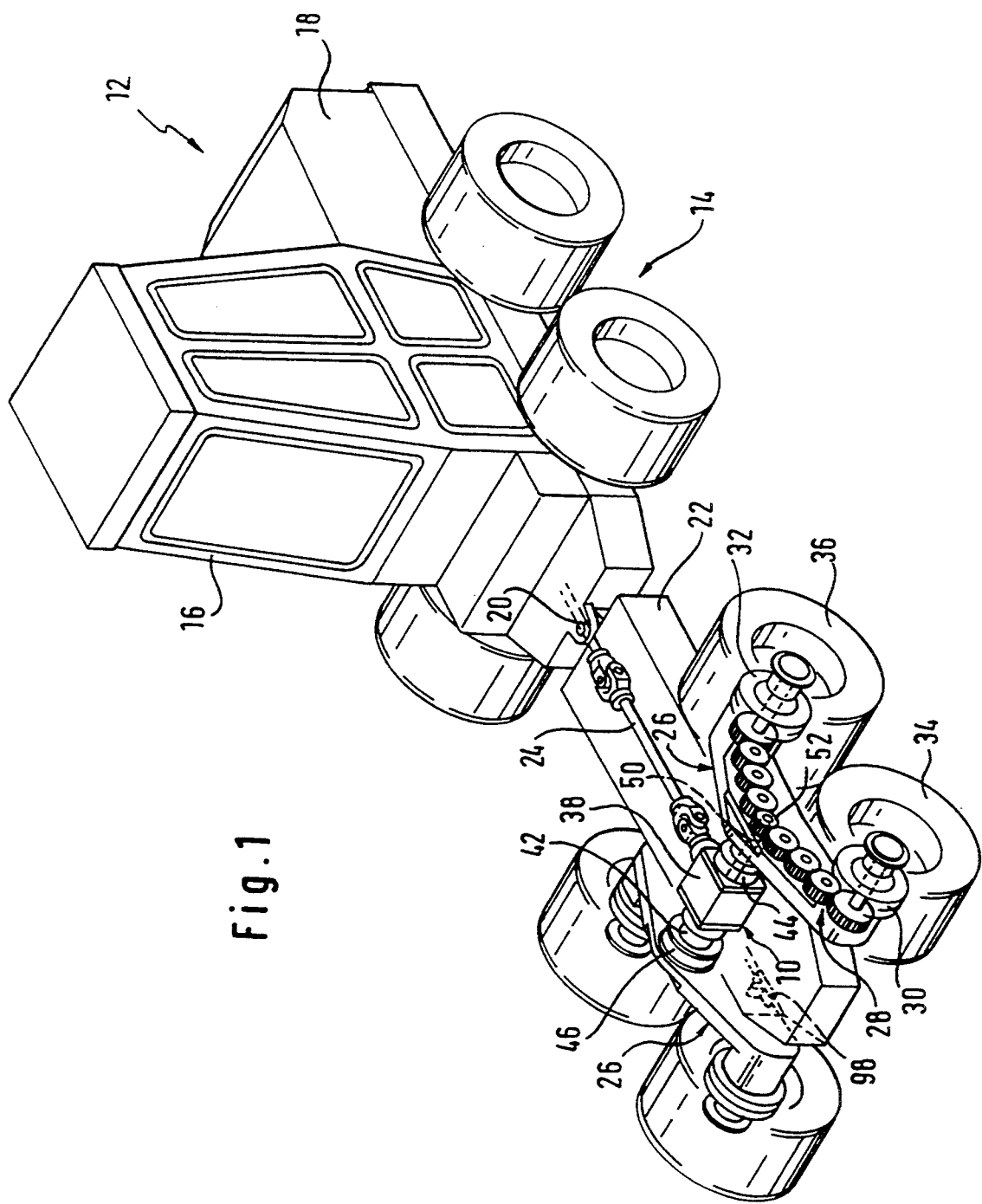
FIG. 1 is a perspective view, with some parts broken away, showing the location of the gear mechanism within a work vehicle.

In the perspective view of FIG. 1, there is shown the location of the gear mechanism 10 used in the invention inside a typical vehicle 12. The vehicle's front portion 14 is represented schematically and shows the driver's cab 16 and the engine 18. The vehicle's front portion 14 is connected with the rear frame 22 by means of a flexible coupling 20. A main drive shaft 24 extends from the engine 18 to the gear mechanism 10 described in the invention, and the drive shaft 24 is likewise connected by means of a coupling to the transition point between the vehicle's front portion 14 and the rear frame 22.

Also shown schematically, as an example of continued transmission of the drive torque, is a gear drive 28 in the tandem axle 26 in which the power distribution down to the planetary gear end stages 30 and 32 takes place by means of the gear drive 28. It can be seen from this diagram that the distribution of power to the tandem axles 26 on both sides of the rear frame 22 is accomplished by means of a differential 38. Further transmission of power in the direction of the two tandem axles 26 takes place by means of a second drive shaft 64 shown in FIG. 4 which is located inside the housing 42. The second drive shaft 64 in the invention is connected to a torque divider 62 in the housing 46 and this torque divider again feeds the power to a gear wheel 52 mounted on a shaft in the wheel box. The gear wheel 52 distributes the power by means of the gear drive 28 to the two planetary end stages 30 and 32. The gear drive 28 must have an uneven number of gear wheels. A chain can be used instead of a gear drive if desired.

This stage of the torque transmission has only a slight speed reduction. The final speed reduction ultimately occurs in the wheel axle, which can lead to the undesired lift effect. A stopper 98, also shown in FIG. 1, is attached to the rear frame 22 and helps to limit the movement of the tandem axle housing 48.

Figure 2:
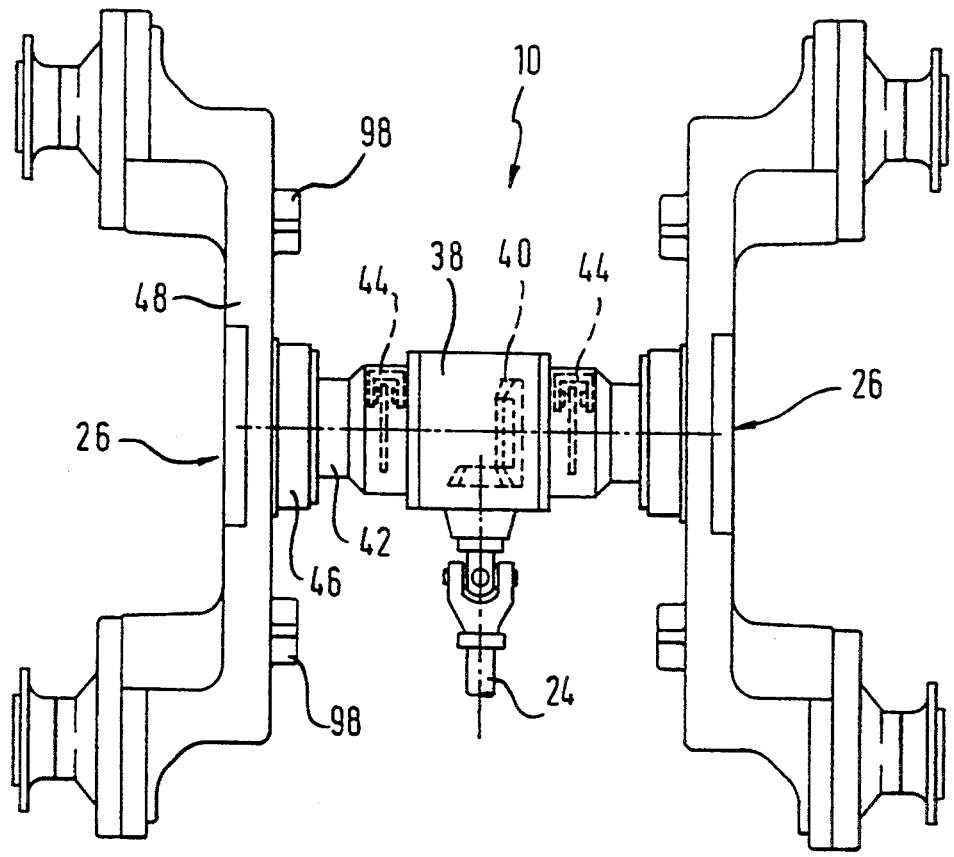
FIG. 2 is a top plan view of the gear mechanism used in the invention with several gear elements shown in phantom.

FIG. 2 shows in greater detail the schematic arrangement of the gear mechanism 10 for tandem axles used in the invention. It can be seen that the main drive shaft 24 is connected by a universal joint to the differential 40 located in the differential housing 38 and that to the right and left of the differential 40 are brake means 44, which are preferably disc brakes, although other types of brakes can also be used.

Figure 3:
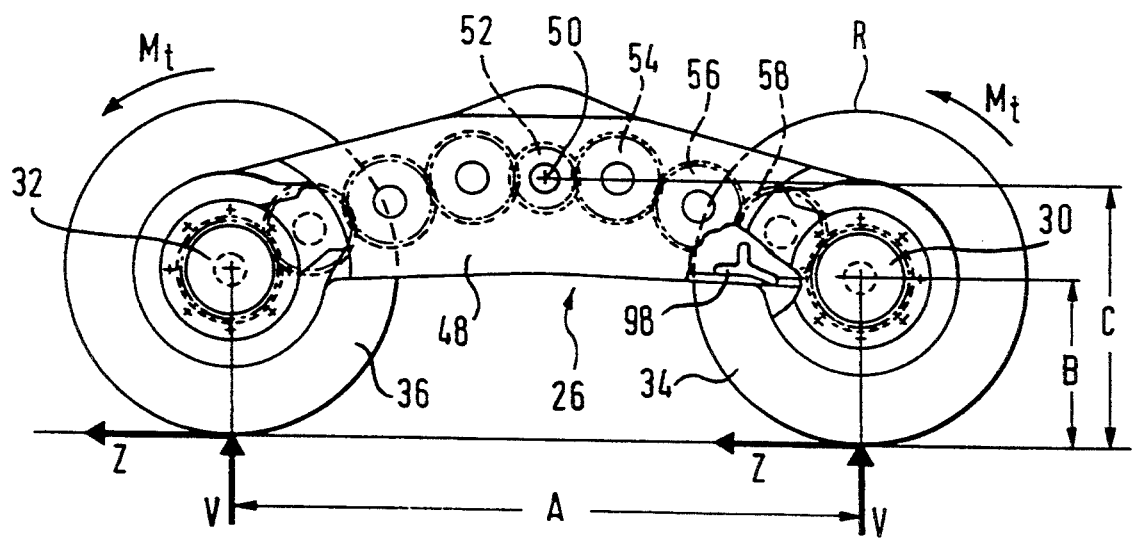
FIG. 3 is a side view of a tandem axle with parts shown in phantom.

FIG. 3 shows a side view of the tandem axle 26. It can be seen that the shaft 50 and gear wheels 52 and 54, located in the tandem housing 48 so they can turn, are in mesh with one another and are responsible for the power transmission from the gear wheel 52 to the planetary gear end stages 30 and 32.

Figure 4:
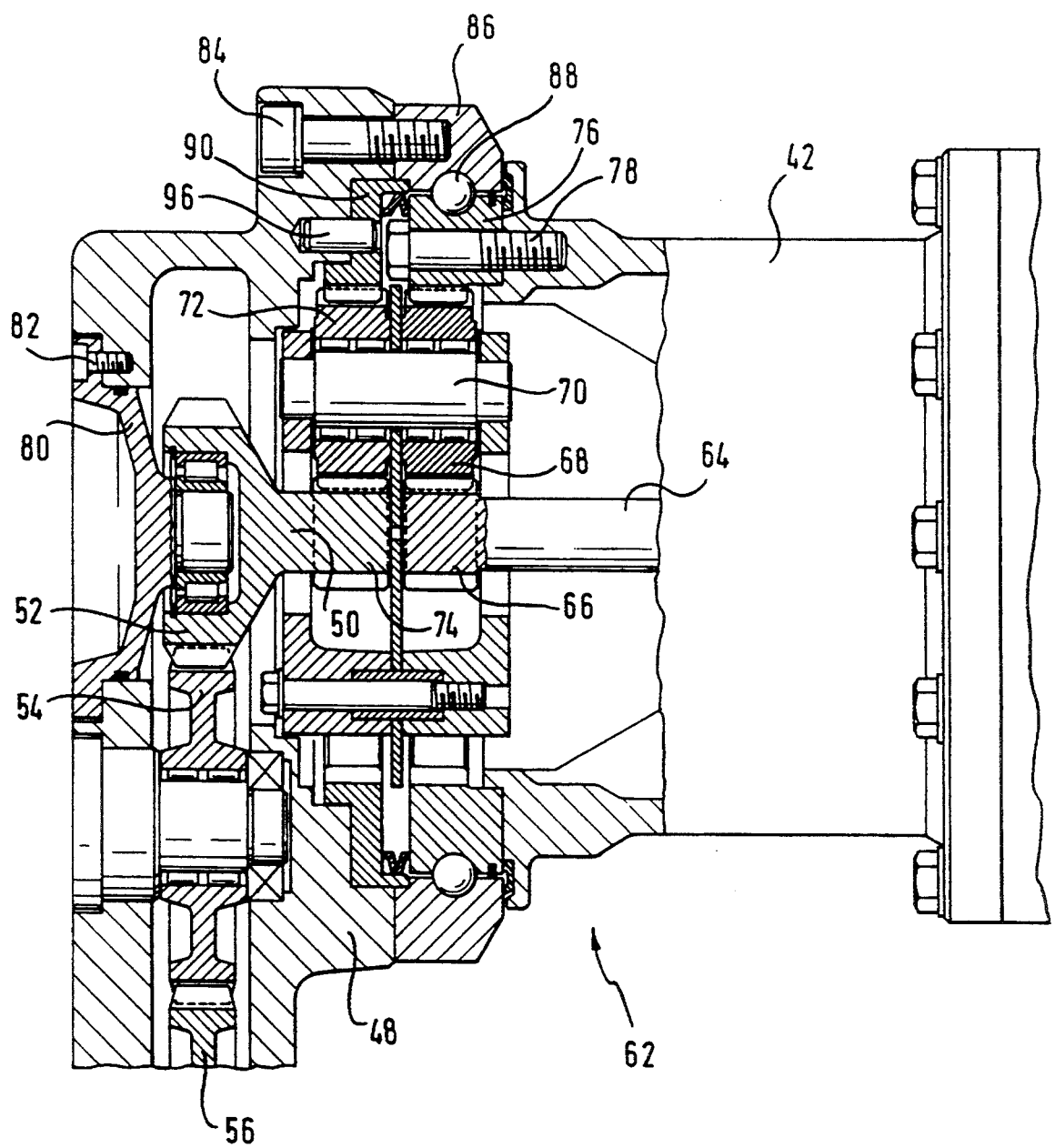
FIG. 4 is a cross-section of the torque divider used in the invention.

FIG. 4 shows a cross section of the torque divider 62 that is used in the invention. In this example, the torque divider 62 consists of a first planetary gear 68, a first sun gear wheel 66 and a second sun gear wheel 74 and a second planetary gear wheel 72, where the first and second planetary gear wheels 68 and 72 of the planetary gear are connected securely with one another on a planetary gear shaft 70. The sun gear wheel 66 is connected to the second drive shaft 64 and drives the first planetary gear wheel 68, which is geared in an internally-geared housing part 76. The housing part 76 is securely fastened to the vehicle frame 42 by means of a screw 78. The second planetary gear wheel 72 is geared in an internally-geared housing part 90, which is attached by a clamp 96 to the tandem axle housing 48. In the torque divider 62 used in the invention, the power is transmitted from the second drive shaft 64 via the first sun gear wheel 66 and the first planetary gear wheel 68 coaxially geared with it, and then in continuation, via the second planetary gear wheel 72, which is securely fastened to the first planetary gear wheel 68, to a second sun gear wheel 74. The second sun gear wheel 74 drives a central drive shaft 50, which transmits the power via the rear wheel 52 to the gear drive 28. The second drive shaft 64 and the central drive shaft 50 are mounted in the same way in both axles. The central drive shaft 50 is mounted in the tandem housing 48 by means of a support 80 and is securely fastened to the tandem axle housing 48 by the screw 82. A chain or band drive can be used alternatively in place of the gear drive 28.

The tandem axle housing 48 is mounted on the frame 86 on the outer part of the internally-geared housing 76 by means of a ball bearing 88 so it can be moved, and the frame 86 is securely fastened to the tandem axle housing 48 by the screw 84.

The so-called lift effect, which results from an unequal power stress on one of the two wheels 34 or 36 of the tandem axle 26, is limited by means of the torque divider 62 used in the invention so that the unequal torque produced is divided into two equal torques, which, on the one hand, work against the vehicle frame and, on the other hand, against the tandem axle housing 48, thus providing a counterforce to the wheel that is lifting.

In order to make the advantages of the invention clearer, a comparison is made in the following numerical example between the axle III used in the invention and shown in FIG. 3 and a normal tandem axle I with a fixed reduction directly on the wheel, with a resultant tendency for wheel lift, as well as with a conventional arrangement II without 1:1 reduction in the tandem axle.

In all three cases, a stress of 11,000 kilopounds as to be distributed to four wheels R. This produces 2,750 kilopounds per wheel. With a wheel radius B=562 mm and $\mu=0.6$, the vertical force V produces a component Z of $(0.6\times2,750)$ 1,650 kilopounds. In all three cases, this leads to a torque M, of $(1,650\times0,562)$ 927 kilopoundmeters. Assuming an axle 50 height C of 762 mm above the ground and a wheel separation A=1,304 mm, this produces the following distribution:

$$\delta R = \frac{(2 \times 1,650) \times 0.762}{1.304} = +1,928$$

In the case I without use of the invention but with high final reduction, this leads to the following strong power and torque differences, which lead to lift of a wheel:

2,750−1,928=822 kilopounds 2,750+1,928=4,678 kilopounds or:

822×0.6×0,562=277 kilopoundmeters 4,678×0.6×0,562=1,577 kilopoundmeters

In the case II without reduction in the tandem axle, this difference should be avoided. However, the 1:1 high reduction in the axle presupposes a torque placement in front of the axle, with all of the technical consequences:

2×927 kilopoundmeters=1,854 kilopoundmeters

The compressive force distributes as follows:

1,854/1.304=±1,421 kilopounds

The wheel stress difference is not great, that is:

822+1,421=2,243 kilopounds to 4,678−1,421=3,257 kilopounds.

In the case of the invention III, there is great advantage in having the final reduction $c_w$ 1.46 for all size designs.

The central torque thus becomes:

1,854/1.46=1,270 kilopoundmeters

The compressive force changes to:

1,270/1.304=974 kilopounds

The wheel stress difference of:

822+974=1,796 kilopounds to 4,678−974=3,704 kilopounds produces the desired distribution exactly.

What is claimed is:

1. A gear mechanism for tandem axles, each having rear and front wheels, for work vehicles for use in difficult terrain, including a vehicle frame, engine means, a main drive shaft driven by said engine means, a differential gear means connected to said drive shaft, drive shaft means driven by the differential gear means; axle housing means, a gear train in each axle housing means in driven contact with each drive shaft means and adapted to provide equal power transmission to front and rear wheels of the tandem axles, a torque divider for each drive shaft means which separates unequal torque on the rear and front wheels into two equal torques which work on the one hand against the vehicle frame and on the other hand against the axle housing means to reduce any lifting effect, each torque divider including a first and second planetary gear having gear wheels, wherein the first and second gear wheels are securely connected to one another through fixed mounting on a common planetary gear shaft, and including sun gear means in mesh with said first planetary gear wheel, and sun gear means being driven by the drive shaft means, a first internally-geared housing secured to the vehicle frame for receiving said first planetary gear wheel for rotation therewithin, and said drive shaft means being drivenly connected to said main drive shaft, a second internally-geared housing secured to the axle housing means, said second planetary gear wheel being received for geared rotation within said second internally geared housing, clamp means for securing said axle housing means to said second internally-geared housing; a second sun gear means, transmission of power taking place through the drive shaft means via said first sun gear means and said first planetary gear wheel and also via the second planetary gear wheel which is securely connected for rotation with said first planetary gear wheel to said second sun gear means and wherein said second gear wheel means drives a central drive shaft which in turn transmits power via a gear wheel to a gear drive.

2. A gear mechanism as defined in claim 1, wherein both said central drive shaft and the drive shaft means are mounted in the same manner in each axle housing means.

3. A gear mechanism as defined in claim 1, wherein said central drive shaft is mounted in said axle and wherein a support means mounts said central drive shaft to the axle housing means.

4. A gear mechanism as defined in claim 1, and further including a frame member, said axle housing means being mounted on said frame member, and bearing means, said frame member being mounted for movement on said first internally-geared housing by said bearing means.

* * * * *